June 29, 1948.  F. N. GILLETTE ET AL  2,444,193
PLAN POSITION INDICATION SYSTEM
Filed July 9, 1945
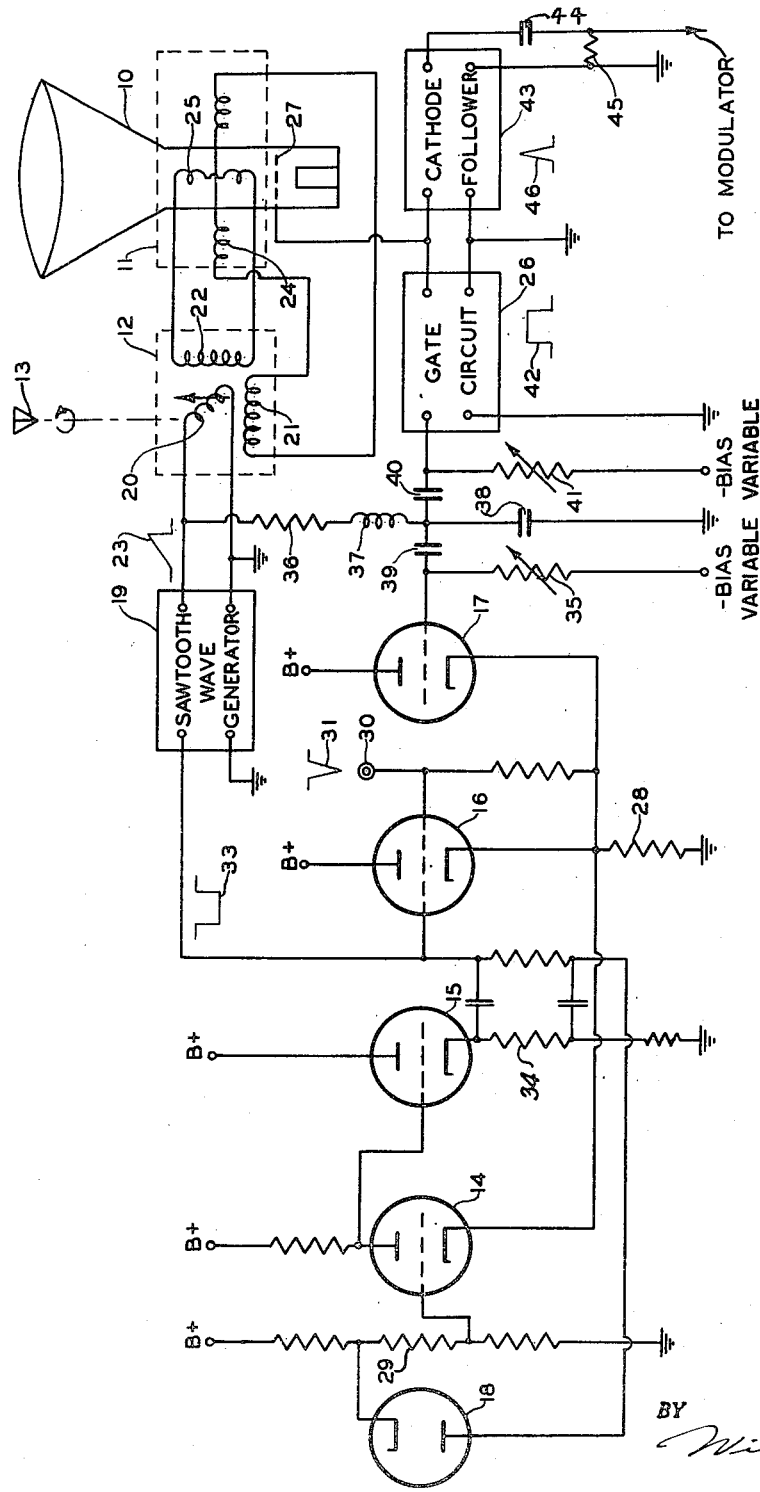
INVENTORS
FRANK N. GILLETTE
LELAND J. HAWORTH
BY
William D. Hall
ATTORNEY

Patented June 29, 1948

2,444,193

UNITED STATES PATENT OFFICE 2,444,193

PLAN POSITION INDICATION SYSTEM

Frank N. Gillette, Cambridge, and Leland J. Haworth, Belmont, Mass., assignors, by mesne assignments, to the United States of America as represented by the Secretary of War Application July 9, 1945, Serial No. 604,040

2 Claims. (Cl. 343—11)

The present invention relates generally to radar systems and more particularly to improved means affording plan position indications on the screen of a cathode-ray tube incorporated in a radar system.

A cathode-ray tube adapted to display plan position indications (hereinafter abbreviated as P. P. I.) presents in polar coordinates a target map on the screen of the area being explored wherein the radar antenna site occupies the center of the tube screen. While the electron beam is swept from the center of the screen radially outward, the beam is intensity modulated by the incoming target echoes, the radar pulse transmitter being fired at the instant the beam departs from the screen center. The angular position of the sweep is controlled by, and synchronized with, the antenna position throughout 360° rotation. Thus, a polar map is developed on which the target ranges are plotted radially against their respective positions in azimuth through 360°.

Heretofore, to attain this purpose, it was conventional to employ a cathode-ray tube of the magnetic deflection type having a deflecting yoke which is caused to mechanically turn in synchronism with the rotation in azimuth of the antenna mount. Such an arrangement involves various mechanical difficulties. Accordingly, it is the primary object of this invention to obviate the mechanical disadvantages attending the use of a rotating yoke by providing an electrical circuit in conjunction with stationary mechanical deflecting means in a P. P. I. cathode-ray tube for rotating the sweep in accordance with the antenna movement in azimuth.

It is another object of this invention to provide an improved P. P. I. circuit for automatically firing a radar pulse transmitter at the instant the sweep causes the beam to depart from the center of the cathode-ray tube screen radially outward.

Yet another object of this invention is to provide an automatic shutoff for the sweep in a P. P. I. circuit when a predetermined amplitude is reached, as well as provision for a constant saw-tooth slope up to that level.

For a better understanding of this invention as well as other objects and features thereof, reference is had to the following detailed description to be read in conjunction with the accompanying drawing illustrating schematically in a preferred embodiment a P. P. I. circuit in accordance with the invention.

Referring now to the drawing, the circuit is shown to include a cathode-ray tube 10, a stationary magnetic deflecting yoke 11, encircling the neck of said tube, associated with a goniometer 12, mechanically coupled to a radar antenna mount 13. For generating and controlling a sweep voltage there is provided a multivibrator arrangement comprising triodes 14, 15, 16, and 17 and a diode 18, said multivibrator governing the operation of a saw-tooth wave generator 19.

Goniometer 12 is of a conventional type having a rotor winding 20 which turns mechanically as antenna 13 rotates in azimuth, and a pair of stator windings 21 and 22, disposed at right angles to each other. Applied to rotor 20 is a linear saw-tooth current, as shown by form 23, produced in the output of generator 19. As a result, the amplitudes of induced currents in stators 21 and 22 vary sinusoidally with the rotation of rotor 20, and the position of the rotor which causes the current in stator 21 to be maximum is displaced 90° away from the position which induces maximum current in stator 22. Although the alternations of the currents induced in stators 21 and 22 are always in phase, the amplitude variations are effectively 90° out of phase because of the 90° separation of the windings.

Stator 21 is connected to the horizontal deflection winding 24 of yoke 11, while stator 22 is connected to the vertical deflection winding 25. Thus, since the output of stator 21 controls the extent of horizontal deflection in cathode-ray tube 10 and the output of stator 22 controls that of vertical deflection, the combined effect of the deflection currents is to produce a circular motion of the spot on the screen of tube 10. The radial position of the spot at any instant is governed by the wave form of the signal applied to rotor 20 which, in this instance is a linear saw tooth.

Since it is necessary to trigger the radar transmitter at the instant the upward swing of the electron beam passes through the center of the screen, as well as to simultaneously start intensity modulation of the beam with incoming echoes, provision is made in the invention to do this automatically and for different sweep speeds corresponding to different ranges. Roughly, this is accomplished by developing in a gate circuit 26 a square-wave voltage gate for the intensity grid 27 of cathode-ray tube 10, which gate is initiated by the range saw-tooth 23 but which does not commence until a predetermined voltage level is reached, that level corresponding to the beam deflection voltage when the trace passes through the center of tube 10. Furthermore, this gate also furnishes the triggering action for the transmitted pulse.

The circuit details and their manner of operation are as follows: The cathodes of the triodes 14, 15, and 17 are connected to ground through a common cathode resistor 28. Triode 16 is normally conductive, whereas the grid of triode 14 is normally biased beyond cutoff by means of a voltage obtained at the tap on resistor 29. A sharp negative trigger pulse applied at terminal 30, such as is shown by form 31, is injected on the grid of triode 16 rendering said tube nonconductive and bringing its cathode down in potential which, in turn, carries the cathode of triode 14 down so that it will now conduct. Diode 18 has its plate connected to the grid of triode 16 and its cathode to the positive side of potentiometer 29, and it functions to maintain a constant relationship between the biases on the grids of triodes 14 and 16.

The grid of triode 15 is directly connected to the plate of triode 14 whereby, when triode 14 is rendered conductive, the resultant voltage drop across plate resistor 32 applies a negative bias to the grid of triode 15. Triode 15 behaves as a cathode follower with the cathode being directly connected to grid of triode 16. Thus, the negative bias applied to the grid of triode 15 when triode 14 conducts results in the application of a negative bias to the grid of triode 16 which maintains the tube in a nonconductive condition for a period continuing after the duration of negative triggering pulse 31 until terminated in a manner to be hereinafter described.

During conduction of triode 15, the negative square wave, as shown by form 33, developed across cathode resistor 34, is fed to saw-tooth wave generator 19 which may be a conventional saw-tooth circuit producing a linear saw-tooth voltage of adjustable speed commencing with the leading edge of square wave 33 and ending with the trailing edge thereof. As described hereinabove the saw-tooth output of generator 19 is applied to rotor 20 to furnish a sweep for cathode-ray tube 10.

In order to terminate the sweep when a desired level is reached, the output of generator 19 is fed back through a cathode follower including triode 17 which is normally biased beyond cutoff through variable resistor 35. At the predetermined level in the saw-tooth wave applied to the grid of triode 17, the cut-off bias thereon is overcome and the cathode voltage rises until a point is reached where triode 16, whose cathode is tied to the cathode of triode 17, is again rendered conductive, thereby terminating negative square-wave 33. Triode 16 remains conductive until the arrival of the next triggering pulse 31.

Since it is desired to have the saw-tooth voltage on the grid of triode 17 correspond in shape to the current sweep through rotor 20, it is necessary to correct for the deforamtion for the sweep caused by the inductance and distributed capacitance of the rotor coil. Hence an R. L. C. network is provided for suitably modifying the input to the grid of triode 17 and also the input to gate circuit 26. The high frequency components of sawtooth 23 are controlled by resistance 36, inductance 37 and capacitance 38 and the low frequencies are controlled for their respective circuits by capacitance 39 and variable resistor 35, and capacitance 40 and variable resistor 41.

The design of saw tooth wave generator 19 is such that the average current of sweep voltage yielded in the output thereof, is zero, hence the return of the sweep would carry the cathode ray beam as far down past the center of the screen as the upward swing. It is necessary to fire the radio transmitter at the instant the upward swing of the beam passes through the center of the screen.

Gate circuit 26 serves both to furnish the trigger for the radar transmitter at the instant the spot departs from the screen center and to lift the voltage on intensity grid 27 to provide a visible trace for the duration of the sweep. The square-wave gate voltage, as shown by form 42, is so controlled as to begin when the saw-tooth voltage applied to gate circuit 26 reaches an amplitude causing the range sweep to pass through the center of the tube. This effect is attained by means including a negative bias applied to gate circuit 26 through variable resistor 41. The output of gate circuit 26 is fed through a conventional cathode follower stage 43 and a differentiating network, consisting of capacitance 44 and resistance 45, to the modulator of the radar transmitter. The differentiating network yields a sharply defined pulse, as shown by form 46, coinciding with the leading edge of square wave 41, the pulse serving to trigger the transmitter.

The output of gate circuit 26 is also fed directly to the intensity grid 27 of cathode-ray tube 10 and acts to raise the voltage on said grid above the thereshold of vision for the duration of the sweep. The grid 27 is intensity modulated by echoes intercepted by the radar receiver for the length of the gated sweep.

If the voltage wave form fed to triode 17 and to gate circuit 26 exactly matches the current wave form induced in deflecting coils 24 and 25, the firing point of the modulator and the amplitude of the sweep are not affected by changes in the duty cycle, since any shift in the level of the current wave will be accompanied by a similar shift in the voltage wave level.

While there has been described what is at present considered a preferred embodiment of the invention, it will be obvious to those skilled in the art that various changes and modifications may be made therein without departing from the invention, and it is, therefore, aimed in the appended claims, to cover all such changes and modifications as fall within the true spirit and scope of the invention. For example in actual practice the Selsyns used have had three windings in the same system in contradistinction to the pair of windings referred to hereinbefore in the specification.

What is claimed is:

1. In a radiant energy object locating system incorporating a cathode-ray tube indicator and an antenna rotating in azimuth, the combination comprising a goniometer including a rotor winding coupled to the antenna to rotate therewith and a pair of perpendicularly disposed stator windings; stationary horizontal and vertical deflection means for the cathode-ray tube, said horizontal means being connected to one of said stators, said vertical means being connected to the other of said stators; a source of saw-tooth waves applied to said rotor whereby a sweep is caused to rotate on the screen of said cathode-ray tube in accordance with rotation of said antenna in azimuth; and a gate voltage circuit connected to the intensity grid of said cathode ray tube whereby the cathode ray beam intensity is increased to provide a visible trace on the screen for the duration of said gate voltage, said gate voltage circuit being responsive to a predetermined voltage amplitude of said saw tooth wave.

2. In a radio object locating system incorporating a pulse transmitter, a cathode-ray tube indicator and an antenna rotating in azimuth, the combination comprising a goniometer including a rotor winding coupled to the antenna to rotate therewith and a pair of perpendicularly disposed stator windings; stationary horizontal and vertical deflection means for the cathode-ray tube, said horizontal means being connected to one of said stators, said vertical means being connected to the other of said stators; a source of saw-tooth waves applied to said rotor whereby a sweep is caused to rotate on the screen of said cathode-ray tube in accordance with rotation of said antenna in azimuth; a gate voltage circuit connected to the intensity grid of said cathode ray tube whereby the cathode ray beam intensity is increased to produce a visible trace on the screen for the duration of said gate voltage, said gate voltage circuit being responsive to a predetermined voltage amplitude of said saw tooth wave, and means to differentiate the output of said gate voltage circuit to derive a trigger pulse for operating said pulse transmitter, said trigger pulse being coincident in time with the leading edge of said gate voltage.

FRANK N. GILLETTE.
LELAND J. HAWORTH.

REFERENCES CITED

The following references are of record in the file of this patent:

UNITED STATES PATENTS

| Number | Name | Date |
|---|---|---|
| 2,272,607 | Higonnet | Feb. 10, 1942 |
| 2,400,791 | Tolson et al. | May 21, 1946 |

FOREIGN PATENTS

| Number | Country | Date |
|---|---|---|
| 520,778 | Great Britain | May 3, 1940 |